United States Patent Office 3,186,924
Patented June 1, 1965

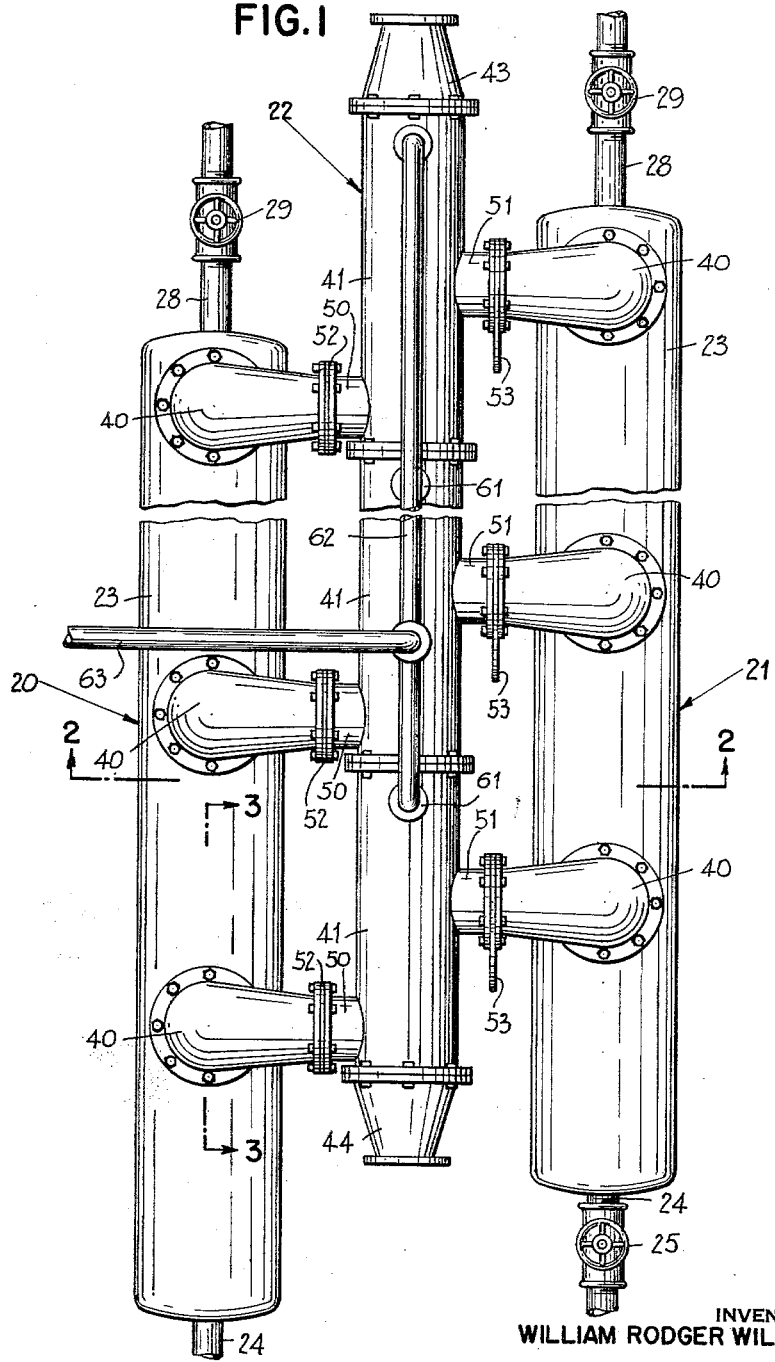

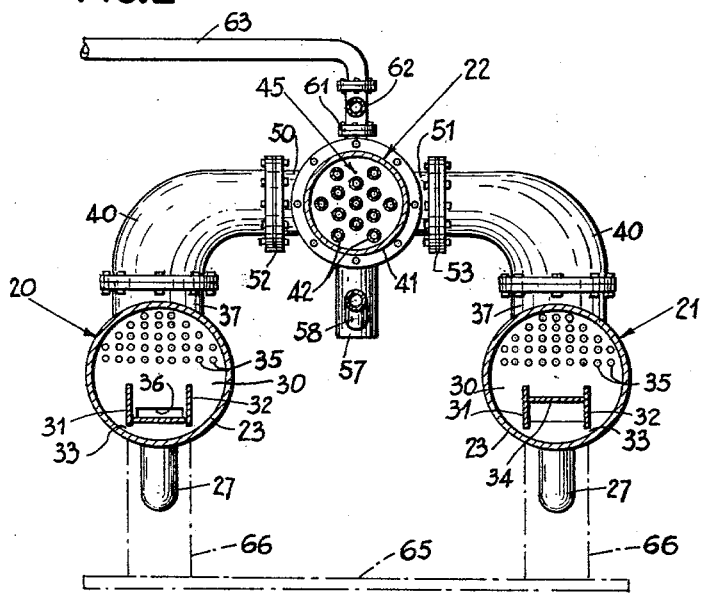
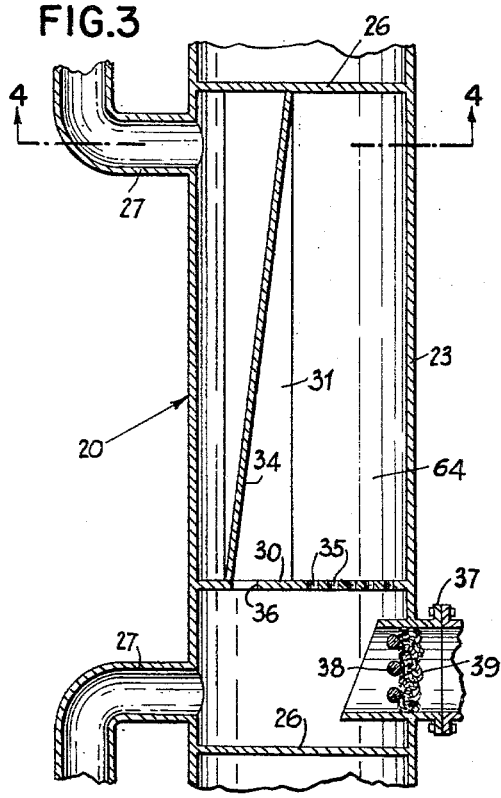
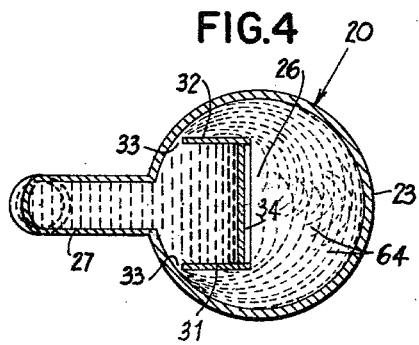

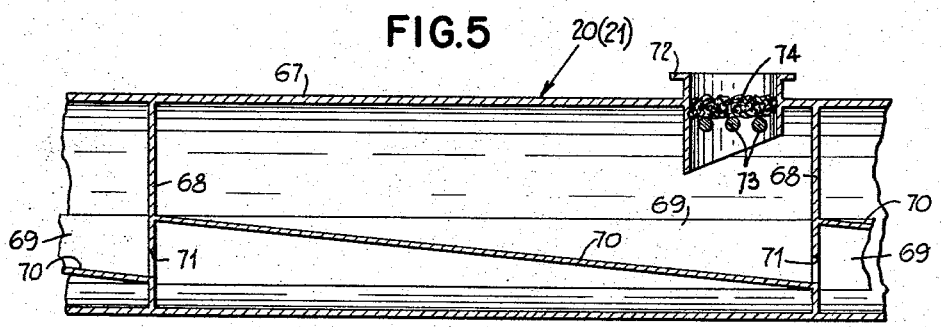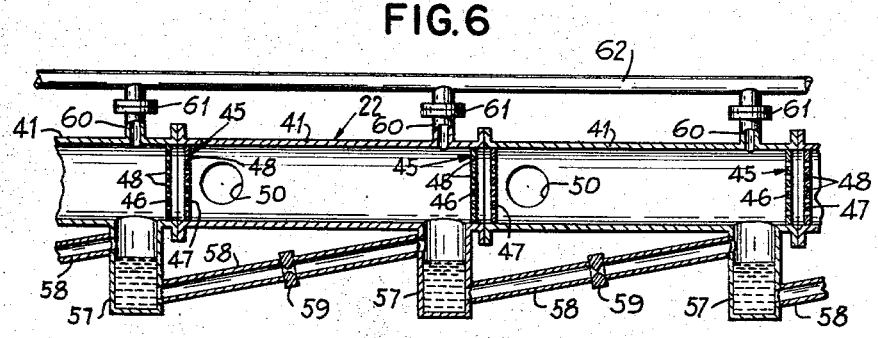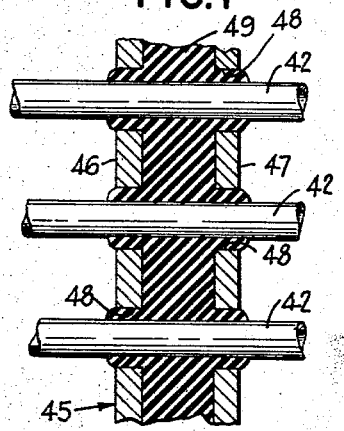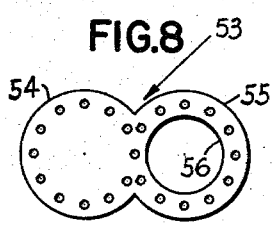

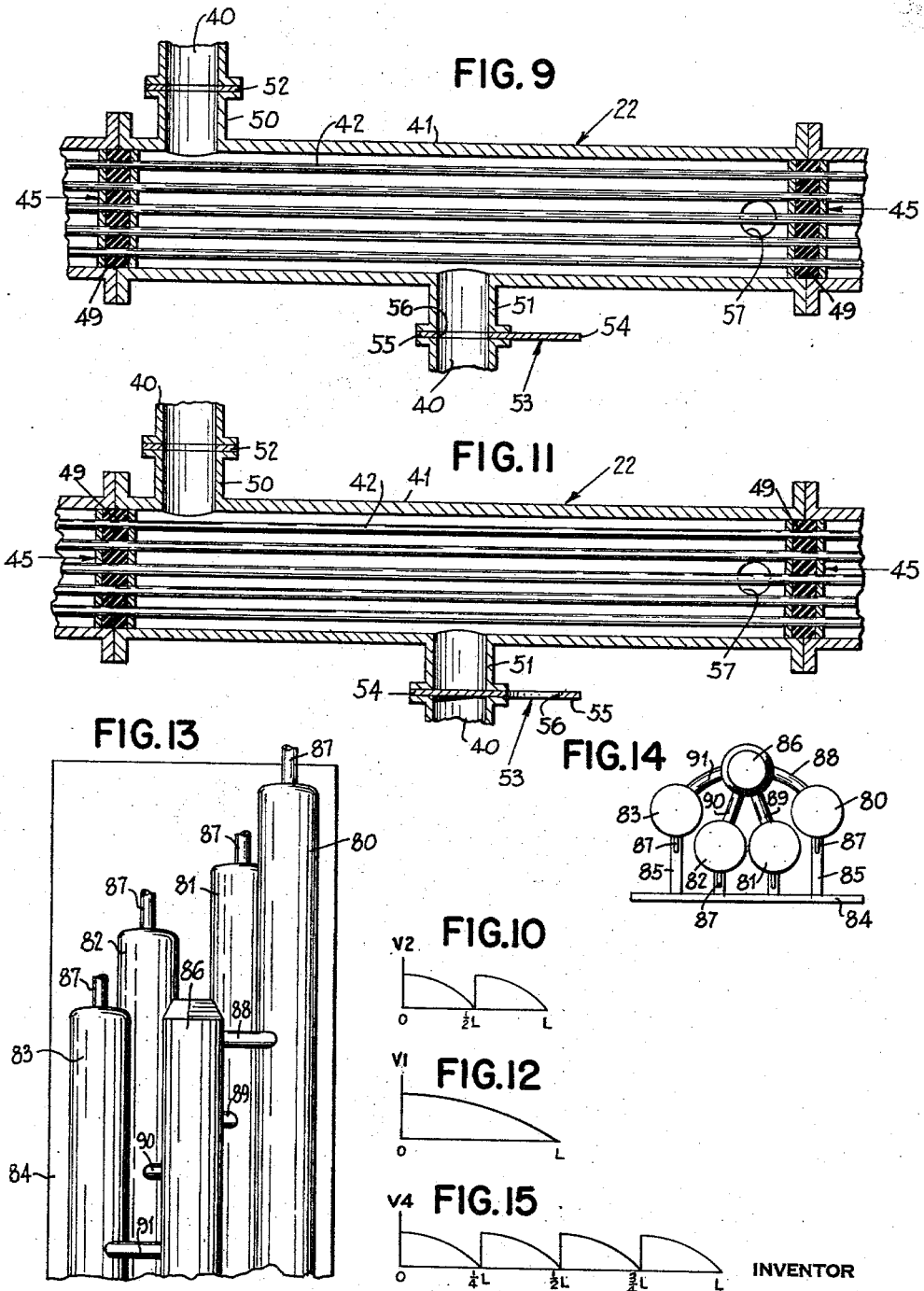

3,186,924
FLASH EVAPORATOR
William Rodger Williamson, Waterford, Conn., assignor to American Machine & Foundry Company, a corporation of New Jersey
Filed Oct. 12, 1961, Ser. No. 144,662
4 Claims. (Cl. 202—173)

This invention relates in general to distillation apparatus or evaporators and, more particularly, to multi-stage flash evaporators.

An object of this invention is to provide a large capacity, high efficiency, multi-stage evaporator.

Another object of this invention is to provide a more versatile evaporator which may be readily adapted to varying product demand conditions.

Still another object of this invention is to provide a flash evaporator which may be operated in times of lower demand at a higher efficiency.

Yet another object of this invention is to provide a more compact, rugged and easily serviced evaporator unit.

A further object of this invention is to provide a multi-stage evaporator unit which is more flexible in its installation as the evaporator units may be easily inter-connected to provide as many stages as desired in a single complete system.

A still further object of this invention is to provide the more efficient flash evaporation of heated fluid in a vaporizer stage.

Yet a further object of this invention is to provide a more simple, effective and easily maintained baffling system in a flash vaporizer stage.

An even further object of this invention is to provide, in a flash evaporator stage, a baffle wihch offers less hydraulic resistance.

An additional object of this invention is to provide a less expensive tube sheet which is more vibration and corrosion resistant.

Another additional object of this invention is to provide a condenser unit which makes more efficient use of its available heat exchange area.

A feature of this invention is to provide a centrally located horizontal condenser comprising a series of condensing stages at different degrees of vacuum disposed end to end in a line and two multi-stage vaporizers disposed parallel to the condenser with each stage of one vaporizer connected to one end of each stage of the condenser and with each stage of the other vaporizer connected to an intermediate portion of each stage of the condenser.

Another feature of this invention is to provide, in a horizontally disposed cylindrical flash vaporizer stage, a baffle which has a cross-section shaped like an H, the baffle being disposed along the length of the evaporator section with the lower edges of the sides of the baffle being disposed with slight clearance above the bottom of the cylindrical stage so that fluid to be vaporized may be introduced under the baffle to jet through the slight clearances and cascade about the inner surface of the cylindrical vaporizer stage with unvaporized fluid falling on top of the H baffle from which the unvaporized fluid may flow or be pumped to another stage.

Many other objects, advantages and features of invention reside in the construction, arrangement and combination of parts involved in the embodiments of the invention and its practice as will be understood from the following description and accompanying drawing wherein:

FIGURE 1 is a top view of a multi-stage flash evaporator according to this invention a with central portion broken away;

FIGURE 2 is a section taken on lines 2—2 of FIGURE 1;

FIGURE 3 is a vertical section taken on lines 3—3 of FIGURE 1;

FIGURE 4 is a vertical section taken on lines 4—4 of FIGURE 3;

FIGURE 5 is a vertical longitudinal section through an evaporator stage showing a second embodiment of this invention;

FIGURE 6 is a vertical longitudinal section through the condenser of this invention with the condenser tubes removed;

FIGURE 7 is a vertical longitudinal section showning fragments of condenser tubes passing through an intermediate tube sheet;

FIGURE 8 is a plan view of a two position gasket;

FIGURE 9 is a top view of horizontal section through one stage of the condenser as it would appear connected to two flash vaporizer stages;

FIGURE 10 is a graph of the linear velocity of steam within the condenser stage shown in FIGURE 9;

FIGURE 11 is a top view of a horizontal section through one stage of the condenser as it would appear connected to a single flash vaporizer stage;

FIGURE 12 is a graph of the linear velocity of steam within the condenser stage shown in FIGURE 11;

FIGURE 13 is a top view of a fragment of one end of a modification of this invention showing a single multi-stage condenser connected to four multi-stage flash vaporizer units;

FIGURE 14 is an end view of the modification of the invention shown in FIGURE 13; and FIGURE 15 is a graph of the linear velocity of steam within a condenser stage of the evaporator shown in FIGURES 13 and 14.

Referring to the drawing in detail, FIGURES 1, 2, 3 and 4 show the vaporizer rails 20 and 21 which are disposed on either side of the centrally located condenser 22. Each rail consists of an elongated cylindrical tank 23 with associated internal and external elements. An inlet pipe 24 leads into the bottom end of each tank 23. An inlet valve 25 may be placed across each inlet pipe 24 to control the quantity of fluid which enters each tank 23.

As shown in FIGURE 3, a number of transverse bulkheads 26 divide each tank 23 into a number of compartments 64 of equal length. The first compartment 64 thus formed is entered by an inlet pipe 24 and the remaining compartments 64 are each entered by an interconnecting U-shaped pipe 27. The U-shaped pipes 27 lead out of the other end of each compartment 64 except for the endmost compartment 64 within each tank 23 from which there leads an outlet pipe 28. If it is desired, valves 29 may be placed across the outlet pipes 28.

Referring further to FIGURES 3 and 4, a second transverse bulkhead 30 is placed close to each bulkhead 26 at the outlet end of each compartment 64. Two side plates 31 and 32 extend parallel to each other between each pair of bulkheads 26 and 30 leaving a slight clearance 33 between their lowermost edges and the lower inner surface of each tank 23. A drain plate 34 extends between the side plates 31 and 32 and between the bulkheads 26 and 30. Each drain plate 34 slopes downward from the upper edges of the side plates 31 and 32 adjacent to a bulkhead 26 to the lower edges of the side plates 31 and 32 adjacent to a bulkhead 30. Each bulkhead 30 contains a number of small apertures 35 disposed in its upper half above the side plates 31 and 32. A single weir or flow opening 36 is formed in each bulkhead 30 above the lower edge of each drain plate 34.

Referring further to FIGURE 3, a steam outlet fitting 37 extends downward beyond each bulkhead 30 within each compartment 64. Rods 38 or other suitable support means position stainless steel mesh or screening 39 in each steam outlet fitting 37.

Referring now to FIGURES 1, 2 and 6, large reducing elbows 40 are bolted on top of each steam outlet fitting 37 to extend upward and inward. The flashing rails 20 and 21 are mounted on suitable supports 66 over a base 65. The condenser 22 comprises a number of cylindrical sections 41 which are joined end to end and each of which is substantially the same length as the compartments 64 of the vaporizer stages formed within the tanks 23 between the bulkheads 26. Extending longitudinally through the condenser 22 are the cooling and condensing tubes 42. Within the endmost portions 43 and 44 of the condenser 22 as shown in FIGURE 1, the condensing tubes may be secured within conventional tube sheets (not shown). However, as shown in FIGURES 6 and 7, intermediate tube sheets 45 are disposed between each cylindrical section 41.

Since, as will be later described, different degrees of vacuum occur between adjacent sections 41 of the condenser 22, if conventional tube sheet were placed between each section 41, the conventional tube sheet would have to be drilled and reamed to close tolerances so that the condensing tubes 42 could be inserted through the conventional tube sheet with minimal clearances to prevent leakage between the sections 41. Not only is such conventional tube sheet costly to fabricate, but it is difficult to insert long lengths of tubing 42 through apertures having close tolerances.

In the fabrication of this condenser, two metal plates 46 and 47 are placed in close proximity transversely across the ends of each section 41. As shown in FIGURE 7, these plates 46 and 47 have large apertures 48 punched or otherwise inexpensively formed in them. The evaporator tubes 42 are then easily slid through the relatively large apertures 48 whereon a suitable thermosetting plastic material 49 is forced between the plates 46 and 47. Before it hardens, the material 49 may flow into any clearances left between the tubes 42 and the apertures 48 in the plates 46 and 47. When the material 49 hardens, it not only provides a seal between adjacent sections 41 of the condenser, but it prevents the tubes 42 from vibrating within the apertures 48. In shipboard installations and the like where vibration is frequently encountered, the relative motion of parts between which there exists a slight clearance can cause premature structural failures and hasten corrosion. The material 49 prevents any such relative motion due to vibrations between the tubes 42 and the plates 46 and 47 so that the tubes 42 will function for a longer period of time. While any suitable thermosetting material 49 may be used in the practice of this invention, "Thiokol" rubber has been found to be a particularly satisfactory material. This may be produced by reacting dichlorodiethyl formal with an alkali polysulfide and serves a purely mechanical function.

Since the condenser sections 41 are fabricated from steel while the condenser tubes are of copper nickel alloy, Monel, admiralty brass, or the like, conventional tube sheet must be of the same metal as the condenser tubes to prevent electrolytic action and corrosion of the tubes. If large enough apertures 48 are formed in the plates 46 and 47, the material 49 may insulate the tubes 42 from the plates 46 and 47 so that less expensive steel plates 46 and 47 may be used. If the tubes 42 contact the edges of the apertures 48 in the plates, plastic plates of material such as fiberglass reinforced epoxy may be used as the pressure difference between condenser stages is less than one pound per square inch.

Referring further to FIGURES 1, 2 and 6, it may be seen that each section 41 has two steam inlet fittings 50 and 51 extending laterally from it. The reducing elbows 40 are connected to the inlet fittings 50 and 51 by means of bolts or other suitable fastening devices. An ordinary gasket 52 may be interposed between the inlet fittings 50 and the elbows 40. However, a dual purpose blocking gasket 53 is interposed between the inlet fittings 51 and the elbows 40.

As shown in FIGURE 8, each gasket 53 consists of two interconnected portions 54 and 55. Portion 54 is a solid plate and blocks the passage of steam through inlet fitting 51 when portion 53 is interspersed between an inlet fitting 51 and an elbow 40. However, when portion 55 containing an enlarged central aperture 56 is interspersed between an elbow 40 and an inlet fitting 51, steam may flow through the inlet fitting 51.

Referring now to FIGURE 6, a distillate collecting pot 57 is suspended beneath each section 41. Pipes 58 extend from the lower portion of one collecting pot into another and have the orifices 59 disposed across them to control flow through the pipes 58. Vacuum fittings 60 are fixed above each section 41 and are connected to a common vacuum line 62. Between the vacuum line 62 and each vacuum fitting 60 there is disposed a suitable small orifice 61. As shown in FIGURE 1, the vacuum pipe 62 is connected to a pipe 63 which leads to a suitable vacuum source (not shown).

The first embodiment of this invention operates in the following manner at full capacity. Preheated fluid to be distilled, which is generally either sea water or brackish water, is introduced into the first compartments 64 of both tanks 23 through the inlet pipes 24. Since each compartment 64 in each of the evaporator rails 20 and 21 is connected to a central condensing section 41 by means of a pair of reducing elbows 40, the vacuum pipe 62 will draw off any noncondensible gases and provide a given degree of vacuum within each section 41 and two connected vaporizer sections or compartments 64. Therefore, as shown in FIGURES 3 and 4, fluid to be treated enters each compartment 64 beneath the higher end of a drain plate 34. As shown in FIGURE 4, this fluid then escapes through the clearances 33 at the bottom of the side plates 31 and 32 and jets or cascades along and about the inner surface of each tank 23 to meet above the drain plate 34 and tumble down upon it. Since the heated fluid flowing from an inlet pipe 24 is under a greater pressure than is the compartment 54 into which it is entering, it escapes through the clearances 33 into an area of lower pressure or partial vacuum so that a part of the fluid flashes into vapor. The violence of the flashing and the pressure differential causes a fountain effect as the fluid jets through the clearances 33. The resulting turbulence causes the maximum amount of water to flash into vapor. The elongated clearances 33 cause a smaller pressure loss than that which would result in a conventional nozzle or other spray system.

Referring now to FIGURES 2, 6 and 9, this vapor then flows through the apertures 35 and the elbows 40 into the steam inlet fittings 50 and 51 and then to a condenser section 41. As the vapor contacts the cooler condensing tubes 42, it condenses into liquid and thus contributes to the maintenance of a vacuum within each condenser section 41 and the vaporizer sections 64 connected to it. Condensed liquid collects in the bottom of each condenser section 41 and flows into a collecting pot 57. Meanwhile, in each section 64 of the tanks 23, unvaporized liquid flows downward on top of the drain plate 34 between the side plates 31 and 32 until it flows through the large opening 36 in bulkhead 30.

As has been pointed out, fluid which has flashed into vapor passes through the apertures 35 in each bulkhead 30 and flows into the steam outlet fittings 37. The apertures 35 are from ⅛ to ¼ inch in diameter to knock out and prevent the passage of any slugs of water which then run down the plates 30. The wire mesh 39 serves to separate out any droplets of liquid which have passed through the small apertures 35 into fitting 37. Fluid then flows through a pipe 27 into the adjacent compartment 64 which is at a lower pressure or higher degree of vacuum.

Referring again to FIGURE 6, the degree of vacuum within each condenser section 41 and the interconnected evaporator sections 64 may be controlled by means of the orifices 61. Thus, as shown in FIGURE 1, as fluid moves towards the top of the drawing through the vaporizers or, as shown in FIGURE 3, as fluid moves to the right through each vaporizer section, each successive vaporizer section is maintained at a greater degree of vacuum. Therefore, as shown in FIGURE 6, each condenser section to the right has a progressively greater degree of vacuum than the one to the left. As has been pointed out, this degree of vacuum is regulated by means of the orifices 61. Referring further to FIGURE 6, as condensed fluid flows into the collecting pots 57, it flows to the right through pipes 57 and through orifices 59 into the adjacent section 41 of lower pressure where the condensed fluid may again flash into steam. This fluid is again cooled and condensed to mingle with newly condensed vapors and drain into a collecting pot 57. This condensed fluid again flows to the right in the same manner into the next condensing section 41. Thus, as shown in FIGURE 6, condensed fluid or distilled water is finally drawn from the right hand collecting pot 57 at a relatively low temperature.

A larger vacuum pump (not shown) is used to evacuate the condenser sections 41 and the vaporizer chambers 64 to start the operation of this apparatus. As the evaporator starts to operate, only a trimmer pump (not shown) is required to maintain the proper vacuum in successive stages. Since gases are constantly drawn through the vacuum fittings 60 during the operation of the evaporator, any noncondensibles such as carbon dioxide, air, etc., are withdrawn from the system and cannot accumulate to contaminate the various stages, and reduce their heat transfer rates and thus the degree of vacuum.

Referring now to FIGURE 9, it may be seen that the gaskets 53 are shown positioned over the steam inlet fittings 51 to allow steam to pass through the steam inlet fittings 51. Thus steam from evaporator rail 20 passes through the steam inlet fittings 50 as steam from evaporator rail 21 passes through the steam inlet fittings 51.

As shown in FIGURE 9, steam from an inlet fitting 50 passes into a condenser section 41 at one end while steam from an inlet fitting 51 enters the condenser section 41 near its center. Since substantially all the steam or water vapor entering each condenser section 41 is condensed into water by contact with the cooler condensing tubes 42, the reduction of volume of the condensing steam determines the velocity of steam flow longitudinally through each condenser section 41.

Referring now to FIGURE 11, it may be seen that gasket 53 may be positioned to block the steam inlet 51 so that the evaporator rail 21 may be disconnected and not used. Thus steam only enters each condenser section 41 through the steam inlet fittings 50. This steam or water vapor then flows to the right as shown in FIGURE 11 until it is entirely condensed. Referring to FIGURE 12, the horizontal axis L indicates the length of a condenser section 41 while the vertical axis V1 indicates the flow velocity to the right of steam along the length of the condensing section 41 shown in FIGURE 11. Thus it can be seen that the steam flows fairly rapidly to the right as it enters each condensing chamber 41. This flow velocity dwindles as the closed right hand end of each condenser section 41 is approached.

When both vaporizer rails 20 and 21 are operated, the flow velocity within each condenser section 41 is graphically shown in FIGURE 10. In FIGURE 10 the length of a condenser section 41 is designated L on the horizontal axis while flow velocity to the right, as shown in FIGURE 9, is indicated along the vertical axis V2. Thus steam entering an inlet fitting 50 flows fairly rapidly to the right until its velocity substantially dwindles to zero just before it reaches a steam inlet fitting 51. Steam entering the condenser chamber 41 through steam inlet fitting 51 then flows fairly rapidly to the right until it is entirely condensed and its velocity also dwindles to zero adjacent to an intermediary tube sheet 45.

This particular condenser and vaporizer construction gives rise to many advantages. If the inlet tubes 50 and 51 were both placed at one end of each condensing section 41, condenser 22 would be less efficient. With the steam inlet fittings 50 and 51 at one end of each condenser section 41, the steam would have a larger initial flow velocity longitudinally through each condenser section 41. This larger flow velocity would render less efficient the use of the available heat transfer area of the outer surfaces of the tubes 42. By placing the steam inlet fittings 51 in central portions of the condensing sections 41, the initial flow velocity of steam within the condenser sections 41 is lower and thus more efficient use is made of the available heat transfer area.

Each condenser unit, as shown in FIGURE 1, may consist of any desired number of stages. For the efficient distillation of sea water any desired number of units such as shown in FIGURE 1 may be interconnected and operated together as a single unit. As shown in FIGURE 1, the first evaporator stages adjacent to inlet pipes 24 and the connected condensing section 41 would be operated at the highest pressure. Each successive stage would be operated at a lower pressure and a lower temperature. Since each successive stage operates at a lower pressure and temperature, cooling water is first fed into the condensing tubes 42 through the endmost fitting 43 and flows towards fitting 44. Thus cooler water is first available to condense steam within the condenser sections 41 which are operating at a lower pressure. As the cooling fluid within the cooling tubes 42 becomes warmed and flows towards fitting 44, the now partially warmed fluid within the condensing tubes 42 is still sufficiently cool to condense steam at the higher pressures in the earlier stages.

If the demand for distilled water is reduced, as it would be for a land based unit during a rainy season, the gaskets 53 may be turned about and secured as shown in FIGURE 11. This disconnects evaporator rail 21 and enables the entire apparatus to function at one-half its former capacity using only rail 20. When only rail 20 is used, the heat transfer surface available within the condensing sections 41 is much greater per pound of steam condensed so that the apparatus functions more efficiently and produces more pounds of steam per B.t.u. of energy input. In addition, since the rails 20 and 21 are identical, one rail may be removed in case of a structural failure for repairs while the apparatus functions at one-half capacity using the other rail.

FIGURE 5 shows a second embodiment of this invention in which each evaporator rail 20 or 21 consists of an elongated tank 67 divided by transverse bulkheads 68 into vaporizer compartments. Between the bulkheads 68 there are disposed the side plates 69 and the sloping drain plates 70. The side plates 69 and the drain plate 70 form a baffle in the same manner as was described for the first embodiment of the invention. Water flows through the weir openings 71 at the lower end of each drain plate 70; under the drain plate 70 in the next vaporizer compartment which is at a lower pressure. This water then flows out the slight clearances between the lower edges of the side plates 69 and the inner surface of the tanks 67 to jet upwards in the manner that has been described in the first embodiment of the invention and flash into steam.

A steam outlet fitting 72 extends through the top wall of the tanks 67 into each vaporizer section. Rods 73 or other suitable support means extend across the steam outlet fittings 72 and support woven steel material 74 or other suitable water separating means. Water which has flashed into vapor within each evaporator section passes out through the steam outlet fittings 72 and passes to a central condenser 22 where it is condensed in the manner which has been described. In some applications, this direct vapor take-off is more economical to build and operates satisfactorily.

Referring now to FIGURES 13 and 14, a modification of this invention consists of the four evaporator rails 80, 81, 82 and 83 which are supported by the suitable support rods 85 above the base 84. A single condenser unit 86 containing a number of sections similar to those shown in FIGURE 9 is disposed above the evaporator rails 80, 81, 82 and 83. An inlet tube 87 leads into a first vaporizer section in each evaporator rail similar to that shown in FIGURE 3 or FIGURE 5. From each vaporizer section in the rails 80, 81, 82 and 83 a connecting fitting 88, 89, 90 and 91 leads to each condensing section within the condenser 86. In each condensing section within condenser 86, a connecting fitting 88 leads to one end; connecting fitting 89 leads into the condensing section down one-quarter of its length from fitting 88; connecting fitting 90 leads into the central portion of the condensing section; and connecting fitting 91 extends into the condenser section along three-quarters of its length.

Therefore, as shown in FIGURE 15, if the length of a condensing section within the condenser 86 is graphically illustrated by the horizontal axis L and the longitudinal velocity of steam within the condensing section is indicated along the axis V4, FIGURE 15 shows the velocity distribution within a condensing section according to this modification of the invention. As has been pointed out in connection with the first embodiment of this invention, this particular arrangement enables the available heat transfer area within each condensing section to be more effectively utilized.

In the modification of the invention shown in FIGURES 13 and 14, if valve means, such as the gaskets shown in FIGURE 8, are inserted across the inlet fittings 89, 90 and 91, two or three evaporator rails may be cut out or rendered inoperative during times of lesser demand or to make repairs.

A further advantage results from this invention in that two or more smaller diameter vaporizer or evaporator tanks having the same capacity as a single larger tank are less expensive to fabricate. This results from the fact that the smaller diameter tanks require a comparatively thinner wall thickness in relation to their cross-sectional area to resist atmospheric pressure when they contain a partial vacuum.

What is claimed is:

1. A flash evaporator comprising, in combination, a first evaporator rail, a second evaporator rail parallel to said first rail, said rails each comprising an elongated tank, transverse bulkheads across said tank at least some of which form vaporizing compartments in said tank, two parallel vertical side plates extending longitudinally between each pair of transverse bulkheads with the lower edges of the side plates disposed with a slight clearance above the lower inner surface of said tank, a drain plate extending between said side plates and extending between said transverse bulkheads, the highest portion of each of said drain plates being immediately adjacent the fluid entrance to a compartment and said drain plates sloping from the upper edges of said side plates adjacent to one of said transverse bulkheads to the lower edges of said side plates adjacent to another transverse bulkhead, means conducting heated fluid under the drain plate in the first compartment of said tank, means conducting fluid flowing downward on each drain plate from the lower edge of each drain plate to under the drain plate in an adjacent compartment, and means conducting fluid flowing down the drain plate in the endmost compartment from the lower edge of said drain plate out of said tank, a steam outlet fitting leading from each of the compartments in said tank, a condenser between and above said evaporator rails, said condenser comprising an end to end series of sections of the same length as the compartments in said evaporator rails, condensing tubes extending longitudinally through said sections, tube sheets separating said sections, a first steam inlet fitting entering one end of each of said sections, and a second steam inlet fitting entering a central portion of each of said sections, means connecting said steam outlet fittings of said first rail to said first steam inlet fittings of said condenser, means connecting said steam outlet fittings of said second rail to said second steam inlet fittings of said condenser, and means maintaining a progressively greater degree of vacuum in successive condenser sections and the connected vaporizer compartments in said rails.

2. The combination according to claim 1 wherein said means conducting fluid flowing downward on each drain plate from the lower edge of each drain plate to under the drain plate in an adjacent compartment comprises said transverse bulkheads containing a large fluid flow aperture disposed above the lower end of one drain plate and beneath the upper edge of an adjacent drain plate.

3. A vaporizer chamber for a flash evaporator comprising, in combination, a cylindrical outer wall, two transverse bulkheads, two parallel vertical side plates extending between the lower portions of said transverse bulkheads with the bottom edges of said side plates disposed with slight clearance above the bottom surface of said cyindrical container, a drain plate extending between said side plates and between said transverse bulkheads, the highest portion of said drain plate being immediately adjacent the fluid entrance to said chamber and drain plate sloping downward from the upper edges of said side plates adjacent to one transverse bulkhead to the lower edges of said side plates adjacent to the other transverse bulkhead, means introducing heated water to be vaporized beneath said drain plate between said side plates, vapor outlet means on said container, and means for draining fluid flowing downward over said drain plate from the lower end of said drain plate.

4. In a multi-stage flash evaporator, an elongated cylindrical tank, transverse bulkheads dividing said tank into vaporization chambers, two parallel, vertical side plates extending between the lower portions of said transverse bulkheads, said side plates being disposed with slight clearance above the lower inner surface of said tank, drain plates extending between said side plates and between said transverse bulkheads, the highest portion of each drain plate being immediately adjacent the fluid entrance to each chamber and drain plates each sloping from the upper edges of said side plates adjacent to one of said transverse bulkheads toward the lower edges of said side plates adjacent to another transverse bulkhead, said transverse bulkheads each containing a large fluid flow aperture above the lower edge of one of said drain plates and below the upper edge of an adjacent drain plate, and steam outlet means for each of said vaporization chambers.

References Cited by the Examiner

UNITED STATES PATENTS

| 2,816,739 | 12/57 | Stoehr | 165—178 |
| 2,908,618 | 10/59 | Bethon | 202—174 X |
| 2,934,477 | 4/60 | Siegfried | 202—175 X |
| 2,948,937 | 8/60 | Rapata | 248—68 X |
| 2,979,443 | 4/61 | Frankel | 202—173 |
| 3,011,743 | 12/61 | Heath | 248—56 |
| 3,045,981 | 7/62 | Hendrickson | 165—178 |

FOREIGN PATENTS

| 831,478 | 3/60 | Great Britain. |
| 855,550 | 12/60 | Great Britain. |

NORMAN YUDKOFF, *Primary Examiner.*

ALPHONSO D. SULLIVAN, *Examiner.*